United States Patent
Okada et al.

(10) Patent No.: US 6,525,643 B1
(45) Date of Patent: Feb. 25, 2003

(54) VEHICLE THEFT PREVENTION DEVICE

(75) Inventors: Hiroki Okada, Toyota (JP); Misako Sugiura, Toyota (JP); Keiji Yamamoto, Okazaki (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/642,794

(22) Filed: Aug. 22, 2000

Related U.S. Application Data (63) Continuation of application No. PCT/JP99/00789, filed on Feb. 23, 1999.

(30) Foreign Application Priority Data

Mar. 2, 1998 (JP) .......................................... 10-049772

(51) Int. Cl.$^7$ .......................... H04Q 1/00; G05B 19/00
(52) U.S. Cl. ..................... 340/5.24; 340/426; 340/5.72; 340/5.26
(58) Field of Search ............................... 340/5.26, 5.72, 340/5.28, 5.31, 5.25, 5.24, 426, 5.27

(56) References Cited

U.S. PATENT DOCUMENTS

| | | | |
|---|---|---|---|
| 5,412,379 A | * | 5/1995 | Waraksa ..................... 340/5.26 |
| 5,448,218 A | | 9/1995 | Espinosa ..................... 340/426 |
| 5,510,777 A | * | 4/1996 | Pilc ........................... 340/5.27 |
| 5,635,916 A | * | 6/1997 | Bucholtz ..................... 340/5.24 |
| 5,926,086 A | * | 7/1999 | Escareno ..................... 340/426 |

FOREIGN PATENT DOCUMENTS

| | | |
|---|---|---|
| JP | 4-16683 | 1/1992 |
| JP | 8-56387 | 2/1996 |
| JP | 8-149127 | 6/1996 |
| JP | 8-507017 | 7/1996 |
| JP | 9-268815 | 10/1997 |
| WO | WO-94/19219 A1 * | 9/1994 |

* cited by examiner

Primary Examiner—Brian Zimmerman
(74) Attorney, Agent, or Firm—Burns, Doane, Swecker & Mathis, LLP (57) ABSTRACT

A vehicle theft prevention device prohibiting release of a vehicle theft prevention control under a predetermined condition even when the control is applied using an authorized portable tool to thereby prevent the vehicle from running. Even when a vehicle ECU 14 controls to release theft prevention control applied by a theft prevention device including an engine control device 12a, a steering locking device 12b, and so on based on a specific code corresponding to a request code from an authorized portable tool 16, the specific code corresponding to the request code from the first portable tool 16 is invalidated upon receipt of a security request code. With this arrangement, an operation to release the theft prevention function of the theft prevention device is prohibited. Moreover, when release control is performed based another specific code (a security code) requiring a request code, vehicle theft can be prevented.

13 Claims, 6 Drawing Sheets

Fig. 6

VEHICLE THEFT PREVENTION DEVICE

This application is a continuation of PCT/JP99/00789, filed Feb. 23, 1999.

TECHNICAL FIELD

The present invention relates to a vehicle theft prevention device, and in particular to a vehicle theft prevention device which prohibits release of a theft prevention function under a certain condition even when the release is instructed using an authorized portable tool.

BACKGROUND ART

Generally, a vehicle door may be provided with a locking device which can be unlocked only using an authorized portable tool (such as a key). Also, an engine can generally be activated only using an authorized ignition key. These are conventional vehicle protections against theft. However, in the case of a mechanical locking device, the device may be removed or broken, as a result of which the vehicle is made drivable and could be stolen. The more malicious vehicle thefts have become lately, the more reliable vehicle theft prevention devices are desirably equipped on a vehicle.

To meet this demand, a vehicle with an additional electronic locking device has been introduced to the market. An electronic locking device, called, e.g., an immobilizer, incorporates a transponder sending an encryption code to an ignition key. The transponder, empowered by electronic waves received via an antenna provided to a key cylinder, sends an encryption code stored therein. An immobilizer ECU is connected to the antenna and determines whether or not the encryption code from the transponder is correct. The immobilizer ECU, also connected to an engine ECU for controlling ignition of and fuel supply to an engine, informs the engine ECU of whether or not a correct encryption code is obtained. With no correct encryption code received by the immobilizer ECU, the engine ECU prohibits fuel supply to and ignition of the engine whereby the engine and the vehicle can be prevented from being activated and therefore running, respectively, in an attempt to activate the vehicle without using an authorized key.

However, in the case of an immobilizer-mounted vehicle, this arrangement, although it can prevent stealing of a vehicle alone, cannot prevent stealing of a vehicle together with a tool (such as an ignition key) for sending an encryption code to the immobilizer, resultantly leaving the vehicle free from any measure against a vehicle theft.

Also, if a spare key should be stolen, as two or more spare keys are generally available to a vehicle, even though they may not usually be in use, the above arrangement leaves a vehicle free from any protection against vehicle theft.

The present invention has been conceived to overcome the above problems, and aims to provide a vehicle theft prevention device for prohibiting release of a theft prevention function under a certain condition even when a regular authorized is used to instruct the release, to thereby prevent the vehicle from running.

DISCLOSURE OF INVENTION

In order to achieve the above object, according to a first aspect of the present invention, there is provided a vehicle theft prevention device including code obtaining means for obtaining, from a portable tool, a request code for requesting release of vehicle theft prevention control, memory means for storing a specific code allowing the release, control means for comparing the request code obtained and the specific code so as to release the vehicle theft prevention control when the request code obtained coincides with the specific code, and to maintain the vehicle theft prevention control when they do not coincide. The vehicle theft prevention device comprises code changing means for changing specific codes at a predetermined changing timing so that a currently effective specific code is invalidated so as to disagree with a request code from the portable tool.

Here, vehicle theft prevention control refers to control over vehicle theft prevention functions, including door lock control, steering lock control, and engine activation prohibition control. A currently effective specific code refers to, for example, a code at a certain timing corresponding to a request code obtained from an authorized portable tool and so on (including ones incorporated into an ignition key, and so on), and capable of releasing the theft prevention control. A predetermined changing timing refers to a timing determined in advance by an authorized user or dealer of the vehicle or a timing at which an authorized user applies a change operation.

With the above arrangement, even when a request code corresponding to a specific code capable of releasing the vehicle theft prevention control at a certain timing is supplied using a portable tool, that specific code may be invalidated at a different timing. Therefore, without the knowledge of means for providing a request code corresponding to a new specific code or possession of a portable tool providing such a request code, a party other than an authorized user or dealer cannot release the theft prevention control as the control means of the vehicle prohibits release of the theft prevention control. As a result, vehicle theft can be reliably prevented.

According to a second aspect of the present invention, in the first aspect, the memory means has a plurality of predetermined specific codes, and the code changing means sequentially selects the plurality of predetermined specific codes at a predetermined changing timing to determine a next specific code.

A next specific code refers to a specific code after specific code change, which corresponds to a reserved portable tool and so on.

With this arrangement, as specific codes are periodically changed, request condition for a request code becomes more severe. As a result, reliability of a theft prevention function can be improved. Note that intervals for selection of a specific code may or may not be constant.

According to a third aspect of the present invention, in the first or second aspect, timing to active the code changing means is determined based on an accumulated value of a vehicle running distance.

According to a fourth aspect of the present invention, in the first or second aspect, timing to active the code changing means is determined based on an accumulated time after change of the specific codes.

With this arrangement, a user with low driving-frequency can be prevented from excessive changing of a specific code, thereby being subjected to reduced burden of changing portable tools every time the vehicle is used. Also, in the case where a vehicle is stolen together with a portable tool capable of providing a request code for releasing vehicle theft prevention control at a certain timing, the owner of the stolen vehicle can be kept safely away from the thief as the stolen vehicle remains drivable within a certain distance or time period. In addition, as the stolen vehicle will be made no longer drivable after running a predetermined distance or a predetermined time, subsequent searching for the stolen vehicle can be facilitated.

According to a fifth aspect of the present invention, in any of first through fourth aspects, timing to activate the code changing means can be changed as desired.

With this arrangement, the changing timing can be set according to the perceived level of safety of an area where the vehicle is mainly used or usually parked. This allows the user to apply theft prevention measure as they desire.

According to a sixth aspect of the present invention, in any of the first to fifth aspects, the control means requests comparison using a corresponding request code when specific codes are changed by the code changing means, irrespective of a state of vehicle control, so as to maintain operation thereof.

With this arrangement, after the change of specific codes, a request code corresponding to a new specific code is compared with the new specific code even though the vehicle is in a state allowing release of theft prevention control, e.g., in a running state. When they do not coincide with each other, it is possible to stop the vehicle. Therefore, with this arrangement, a use of a stolen vehicle can be reliably prohibited. Note that, desirably, the control means starts the operation in response to confirmation that an engine is stopped or a parking brake is placed in an ON position as it is not preferable to apply an engine stop operation and so on (prohibition of restarting) to a running vehicle.

According to a seventh aspect of the present invention, a vehicle theft prevention device in any of second to sixth aspects, comprises control limit means for limiting a vehicle theft prevention function allowed based on a specific code having a low frequency of coincidence with a request code obtained, the specific code being among those selected by the code changing means.

A specific code with a low frequency of coincidence refers to a code sent from a back-up portable tool, and so on, which, for example, may be kept for a long time in a place different from where the vehicle is used, and resultantly kept away from comparison with a request code for more than a predetermined time (e.g., 500 hours). Limiting a vehicle theft prevention function means partial or complete prohibition of release of the theft prevention control.

With this arrangement, a portable tool with low frequency of use is made substantially incapable of controlling the vehicle. Therefore, should a back-up portable tool and so on be stolen, illegal use of the stolen vehicle can be prevented. be stolen, illegal use of the stolen vehicle can be prevented.

According to an eighth aspect of the present invention, in any of the first to seventh aspects, canceling means is also included for canceling invalidation of a specific code, under specific conditions.

According to an eighth aspect of the present invention, in any of the first to seventh aspects, canceling means is also included for canceling invalidation of a specific code, under specific conditions.

Here, to cancel invalidation of a specific code means temporary release of an operation of a theft prevention device by invalidating a specific code, or postponing of shifting to a state where a specific code is invalidated.

With this arrangement, as anyone who meets a predetermined condition, i.e., an authorized user or dealer, and so on, can temporarily release invalidation of a specific code and postpone shifting to a state where a specific code is invalidated, it is possible to prevent deterioration of the ease with which the user can use the vehicle theft prevention device, while maintaining the theft preventing effect.

According to a ninth aspect, in the eighth aspect, the canceling means operates when a predetermined condition is met by a predetermined manual canceling operating.

Here, a predetermined manual canceling operation is an operation for inputting a code number or combining switches of various devices equipped in the vehicle.

With this arrangement, only a specific person who can know the manual canceling operation (an authorized user or dealer, and so on) can easily cancel invalidation of a specific code.

According to a tenth aspect, in the eighth aspect, the canceling means operates when a canceling request code stored in the memory means is obtained.

According to an eleventh aspect, in the tenth aspect, the canceling request code is sent from a portable tool other than a portable tool which sends the request code.

With this arrangement, only a specific person who can know the manual canceling operation (an authorized user or dealer, and so on) can easily cancel invalidation of a specific code.

BEST MODE FOR CARRYING OUT THE INVENTION

In the following, preferred embodiments (hereinafter referred to as embodiments) will be described based on the accompanying drawings.

Embodiment 1.

Figure 1:
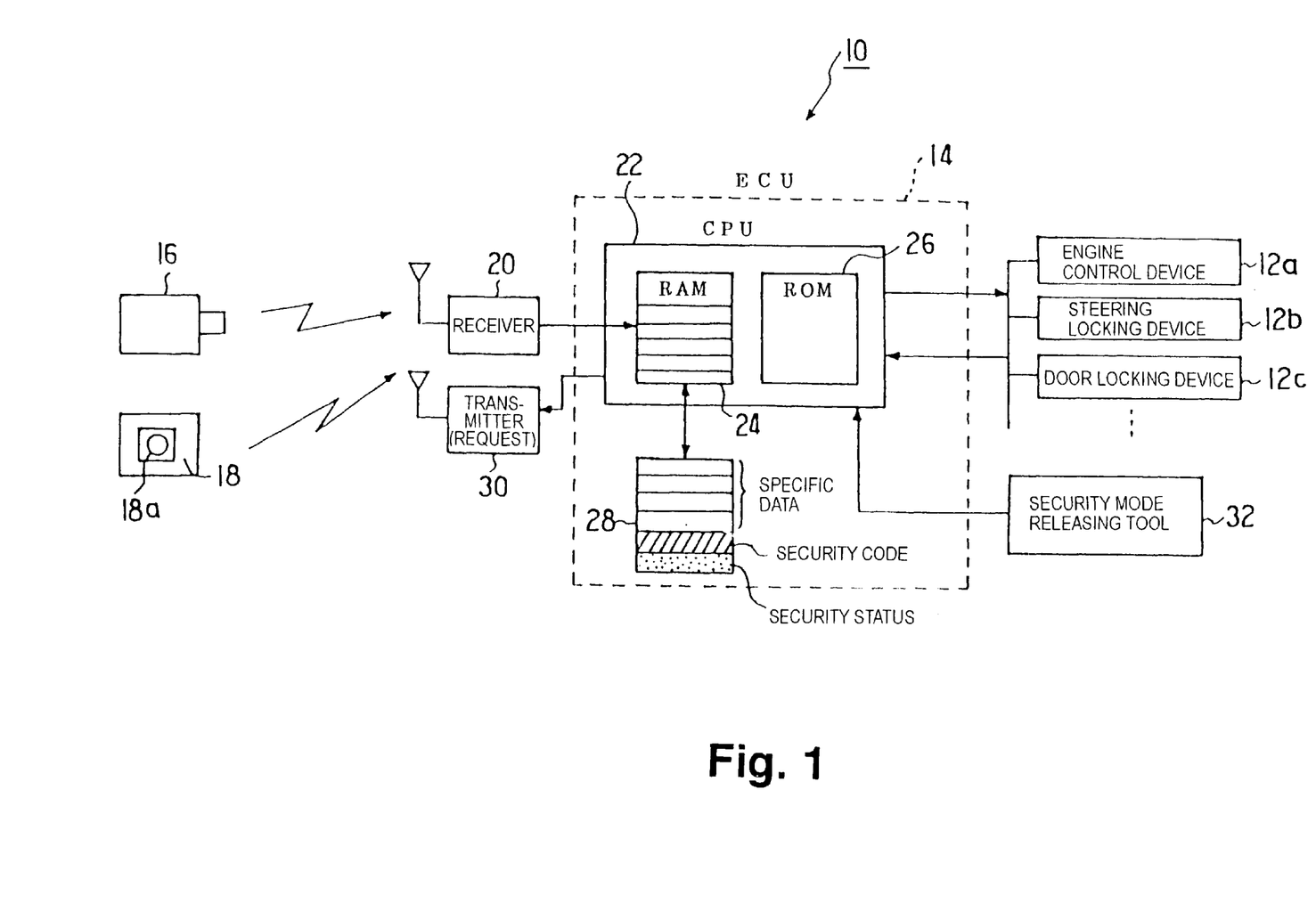
FIG. 1 is a block diagram explaining a structure of a theft prevention device in a first preferred embodiment of the present invention.

FIG. 1 is a block diagram showing an entire structure of a vehicle theft prevention device 10 according to embodiment 1. A vehicle theft prevention device 10 comprises a vehicle-side system having an electronic control unit (hereinafter referred to as an ECU) 14 as a main component, a first portable tool 16, and a second portable tool 18. The ECU, responsible for execution of a theft prevention operation on the vehicle side, is connected to an engine control device 12a, a steering locking device 12b, a door locking device 12c, and so on. A first portable tool 16, generally carried by a user, or an authorized owner of the vehicle, sends a predetermined ID code (a request code to be described later). A second portable tool 18 can send an ID code (a security request to be described later) different from that from the first portable tool 16.

A first portable tool 16 may be either incorporated into a vehicle ignition key, or prepared separately from the ignition key. A first portable 16 and a second portable tool 18 may be formed using the same body. A first portable tool 16 sends a request code (ID code) for requesting release of theft prevention control applied by the vehicle-mounted engine control device 12*a,* steering locking device 12*b,* door locking device 12*c,* and so on. While the theft prevention function is kept effective, the vehicle-mounted engine control device 12*a,* steering locking device 12*b,* door locking device 12*c,* and so on are placed in an engine activation prohibited state, a steering locked state disabling a steering operation, and a door locked state with doors locked, respectively. The request code is a code for requesting the respective theft prevention devices to allow activation of the engine, unlocking of the steering, and unlocking of the doors, and so on.

A second portable tool 18 sends a security request code for controlling the theft prevention devices to set a theft prevention state (a security mode). A security mode is set by depressing a switch 18*a,* provided on the second portable tool 18.

A request code from the first portable tool 16 and a security request code from the second portable tool 18 are supplied, via a receiver 20, connected to the vehicle ECU 14, to a CPU 22 in the ECU 14. The CPU 22 incorporates a volatile memory, or RAM 24, and a read only memory, or ROM 26. The RAM 24 provides an operation area for the respective codes, and the ROM 26 stores a control program and so on, of the vehicle theft prevention device 10, for changing a specific code, a limiting control function (described later), and so on. The CPU 22 causes a request code and a security request code, received via the receiver 20, to be stored in the RAM 24.

The CPU 22 is connected to a non-volatile memory, or an EEPROM 28, which stores codes (hereinafter referred to as specific codes) corresponding to request codes from the first portable tool 16. Only specific codes can release theft prevention control by the theft prevention device. Here, generally, an ignition key may be available for every user. That is, two or more reserve ignition keys are available for a vehicle in the case of losing or damaging the original. Accordingly, with a design in which a first portable tool 16 is incorporated into an ignition key, two or more first portable keys 16 are available for each ignition key, and a specific code is thus determined for every first portable tool 16.

In response to receipt of a request code via the receiver 20, the CPU 22 reads a specific code registered for an authorized user, from the EEPROM 28 to the RAM 24, and then determines whether or not the received request code coincides with the specific code read to the RAM 24. Only when they coincide, the CPU 22 releases the effective theft prevention function, including release of prohibition on engine activation, of steering and door locking, and so on.

Embodiment 1 is characterized in that a current specific code thus far used in comparison with a received request code is invalidated at a certain time. In other word, a first portable tool 16, which has been usable up to the present, is made no longer usable at a certain time.

Here, the EEPROM 28 stores specific codes (security codes) different from the above specific code. When the CPU 22 receives a security request code from the second portable tool 18 via the receiver 20, and stores the code in the RAM 24, the CPU 22 compares the security request code with a security code, which is set for every vehicle. When they coincide with each other, the CPU 22 activates a theft prevention function, irrespective of the presence or absence of a authorized request code, to thereby apply theft prevention control (to turn on security mode), including prohibition of engine activation, setting of steering lock (ON) and door lock (ON), and so on. At the same time, the CPU 22 invalidates a specific code thus far used in the RAM 24 as a comparison reference, and makes another specific code (e.g., a security code) effective. With this arrangement, a release operation will thereafter not be applied to the theft prevention device despite receipt of a request code from the authorized first portable tool 16.

Therefore, should a vehicle be stolen together with a first portable tool 16, the authorized user can send a security request code using the second portable tool 18 to thereby set a security mode in the vehicle, and also invalidate the function of the stolen first portable tool 16. As a result, vehicle theft can be prevented, and/or driving of a stolen vehicle can be prohibited whereby damage due to the vehicle theft can be minimized. In a security mode, a security code is used as a comparison reference in the RAM 24. Under this condition, the ECU 14 constantly sends a confirmation code addressing a second portable tool 18 to confirm the presence thereof, and receives a response code (e.g., a security request code) corresponding to the confirmation code from a second portable tool 18. While the response codes corresponding to the security code read to the RAM 24 are received, at least prohibition of engine activation and steering locking can be released. With this arrangement, inconvenience of an immobile vehicle due to a security mode mistakenly set by a user can be avoided. Also, as a vehicle remains drivable during this period, a third party without a second portable tool 18 can drive the vehicle in a specified area (while the ECU 14 keeps receiving a response code from the second portable tool 18). However, the vehicle becomes no longer drivable after moving out of the specified area when the vehicle has been shifted to a full security mode. That is, after the occurrence of a vehicle theft, the user can be kept away from the thief having driven away, and thus protected from secondary damage by the thief.

Note that, once a security mode is set, the ECU 14 writes a security status into the EEPROM 28. Therefore, even if a battery is removed, the once established security mode is not reset. An unauthorized third party without permission (any party other than an authorized user, dealer, and so on) cannot release the set security mode.

Preferably, a security mode can be released only using a dedicated releasing tool 32, available at an authorized dealer and so on. As described above, while an authorized user's second portable tool 18 keeps sending a response code to the ECU 14 and the ECU 14 keeps receiving such response codes, ECU 14 controls to release at least prohibition of engine activation and steering locking. Therefore, should a security mode be intentionally or mistakenly set, the authorized user can drive the vehicle to an authorized dealer, who, after identifying the vehicle and the user, releases the security mode (by erasing a security status), using a releasing tool 32.

Figure 2:
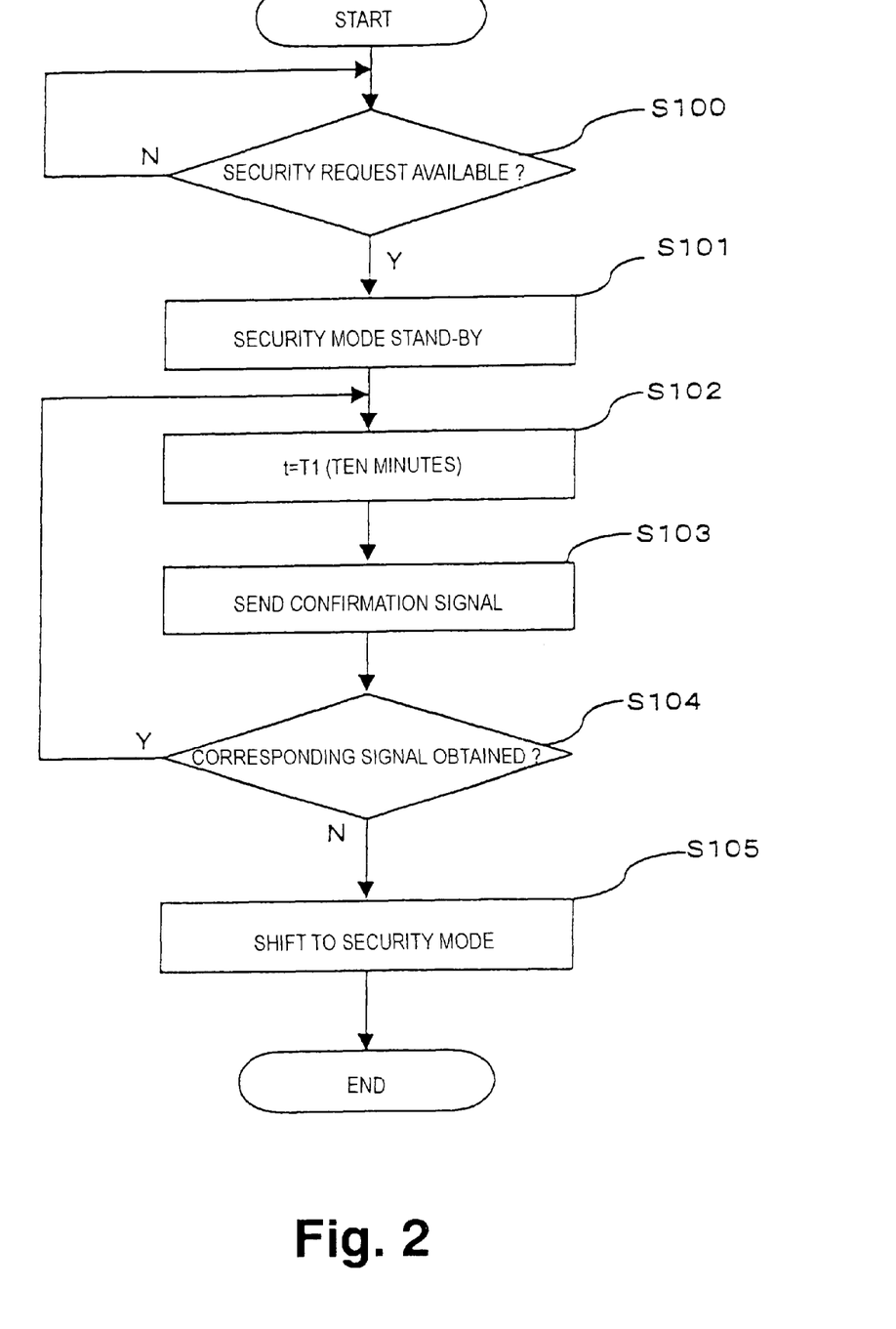
FIG. 2 is a flowchart explaining transition to a security mode of the theft prevention device in the first preferred embodiment of the present invention.

FIG. 2 is a flowchart explaining a procedure for shifting to a security mode in this embodiment.

Generally, the vehicle ECU 14 compares a request code from the first portable tool 16 and a specific code, and, when they coincide with each other, releases theft prevention control by the engine control device 12*a,* the stealing locking device 12*b,* the door locking device 12*c,* and so on.

During this operation, the ECU 14 simultaneously keeps checking the presence of a security request from a second portable tool 18 (S100). When the presence of a security request is confirmed, the ECU 14 reads a security code, instead of a specific code, to the RAM 24, and invalidates a specific code corresponding to a request code from the first portable tool 16 to thereby set a security stand-by state to apply all theft prevention functions other than release of prohibition on engine activation and steering lock (S101). At the same time, the ECU 14 causes an associated timer t (not shown) to count. After the lapse of t=T1 (e.g., 10 minutes) (S102), the ECU 14 starts sending a confirmation code (signal) via a transmitter 30 to confirm the presence of a second portable tool 18 (S103), and then detects whether or not a response code (signal) corresponding to the confirmation code is obtained (S104). When such a response code is obtained, the ECU 14 determines that an authorized user with a second portable tool 18 is present near the vehicle, and returns to the process step (S102) to repeat the above process, specifically, causing the counter t to count and, after a lapse of a predetermined time, sending a confirmation code. With this arrangement, should a security mode be mistakenly set, an authorized user who has a second portable tool 18 can drive the vehicle to an authorized dealer to release the security mode. Also, should a vehicle be stolen, as the thief can drive the vehicle for a while, keeping the user away from the thief.

At S104, when no corresponding response code can be obtained, in other words, when a decision is made that no authorized user with a second portable tool 18 is present near the vehicle, the ECU 14 shifts to an absolute security mode, including prohibition of engine activation and steering locking (S105), whereby driving of a vehicle, if stolen, will be totally prohibited after the lapse of a predetermined time. Note that, for security purposes around the vehicle, thee process at (S105) is preferably applied to a running vehicle after confirmation that an engine is stopped or a parking break is placed in an ON position, as described above. The ECU 14, continuously sending a confirmation code after the process at (S105), recovers a security stand-by state upon confirmation of a response code from a second portable tool 18, in other words, when an authorized user with a second portable tool 18 has returned to the vehicle, to thereby place the vehicle in a drivable state so that the authorized user can drive the vehicle, particularly, to an authorized dealer.

As described above, in this embodiment, a specific code thus far usable is deliberately invalidated by an authorized user so that release of a theft prevention function can be controlled using another code, e.g., a security code. With this arrangement, should a vehicle be stolen together with a first portable tool 16, a vehicle theft prevention measure can be applied with respect to a third party without the knowledge of the existence of a second portable tool 18.

Embodiment 2.

Figure 3:
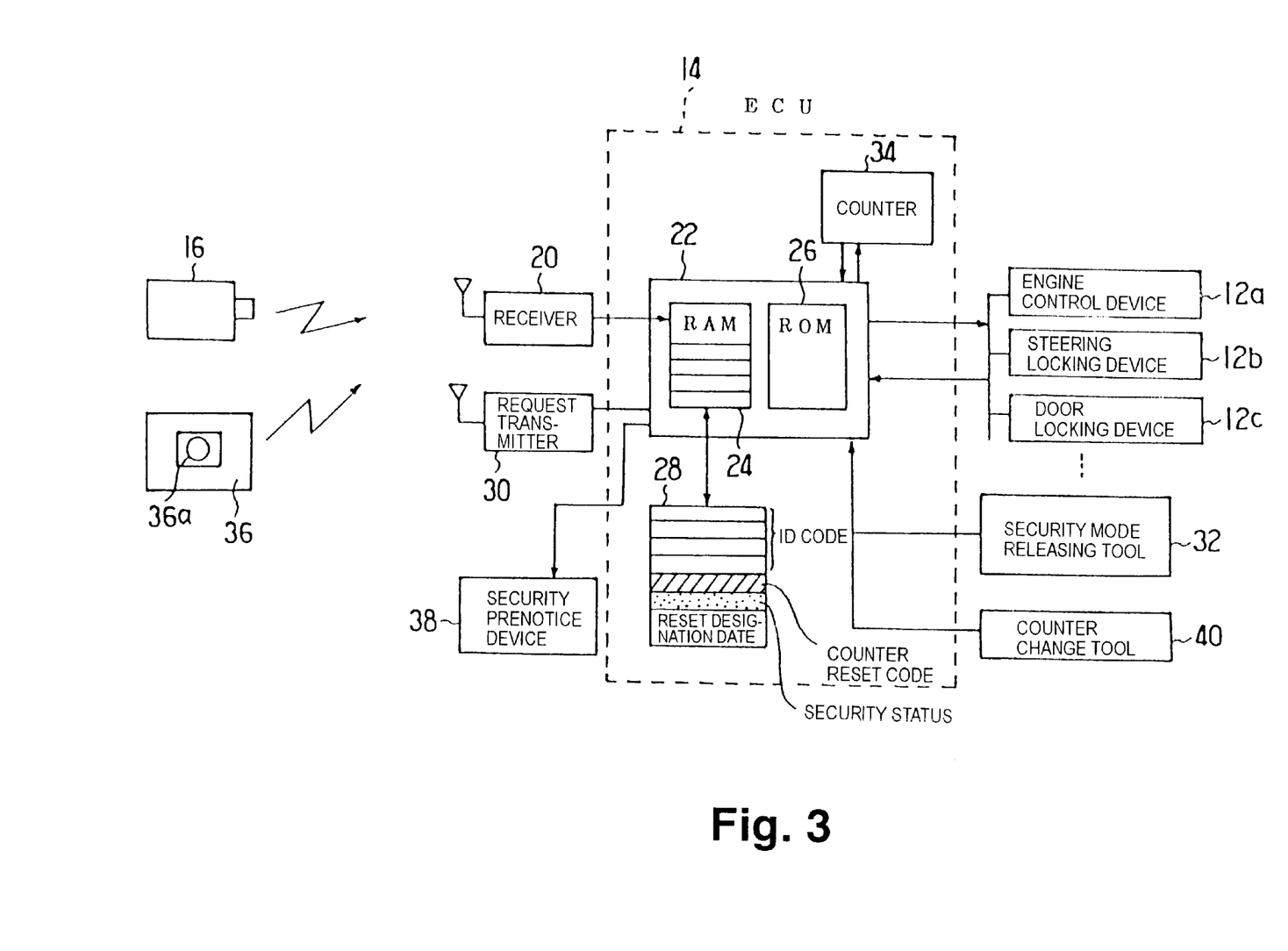
FIG. 3 is a block diagram explaining a structure of a theft prevention device in a second preferred embodiment of the present invention.

FIG. 3 is a block diagram showing an entire structure of a vehicle theft prevention device 10 according to embodiment 2, in which identical components to those in embodiment 1 are given identical reference numerals and their explanations are not repeated here. Differing from embodiment 1, in which an authorized user sets a security mode at a desired timing (i.e., when a vehicle is stolen) using a second portable tool 18, in embodiment 2, a security mode is set at a time when an addition value of a counter 34 has been counted up to a predetermined value (for a running vehicle, when the addition value has been counted up to a predetermined value and a stopped engine or a parking brake placed in an ON position is confirmed). Note that shift to a security mode based on the counter 34 can be prevented using a second portable tool (canceling means) 36, specifically, by operating a switch 36a to send a counter reset request code before the shift to a security mode is effected. The counter reset request code is compared with a counter reset code stored in the EEPROM 28, and when they coincide with each other, the counter 34 is reset. In this arrangement, preferably, a security prenotice device 38 may be provided so as to inform a user in advance of an upcoming shift timing to a security mode at multiple steps using an alarm, voice guidance, a blinking light, and so on.

The counter 34 may be a time measuring counter, a distance measuring counter, or the like. For a time measuring counter 34, a shifting timing may be set at 100 hours, 1000 hours, 1 week, 1 month, 1 year, and so on. For a distance measuring counter 34, it may be set at 10 km, 100 km, 1000 km, and so on. Preferably, the setting can be changed according to a user's frequency of use of the vehicle. For a user with a low driving frequency, setting of a longer shift interval to a security mode may help eliminate the need to reset a security mode every time the vehicle is used, reducing complications accompanying the resetting operation. In particular, the use of a distance measuring counter 34 may reduce the burden on a user with a low driving frequency. A counter value can be desirably changed using a counter change tool 40, available at an authorized dealer, and preferably determined according to the authorized user's driving frequency and/or a perceived level of safety in an area where the vehicle is mainly driven.

A security mode can be released using a security mode releasing tool 32, available at an authorized dealer, similar to embodiment 1. Also similar to embodiment 1, an authorized user can drive the vehicle set in a security mode when a theft prevention function is partially released via a communication using a confirmation code and a response code between the ECU 14 and the second portable tool 36. Alternatively, a security mode may be reset using a second portable tool 36. In this design, for the purpose of improved security, an encryption code may preferably be transmitted to effect a resetting operation through continual operation of a plurality of switches 36a provided to a second portable tool 36.

As yet another alternative, a calendar timer may be provided in the counter 34 so that a security mode is automatically set, irrespective of the addition value of the counter, unless the counter is reset on a designated date (e.g. the $10^{th}$ of every month). With this arrangement, a security mode is set without fail on a designated date even with a vehicle is not in use for a long time. This enhances the reliability of a theft prevention function.

Figure 4:
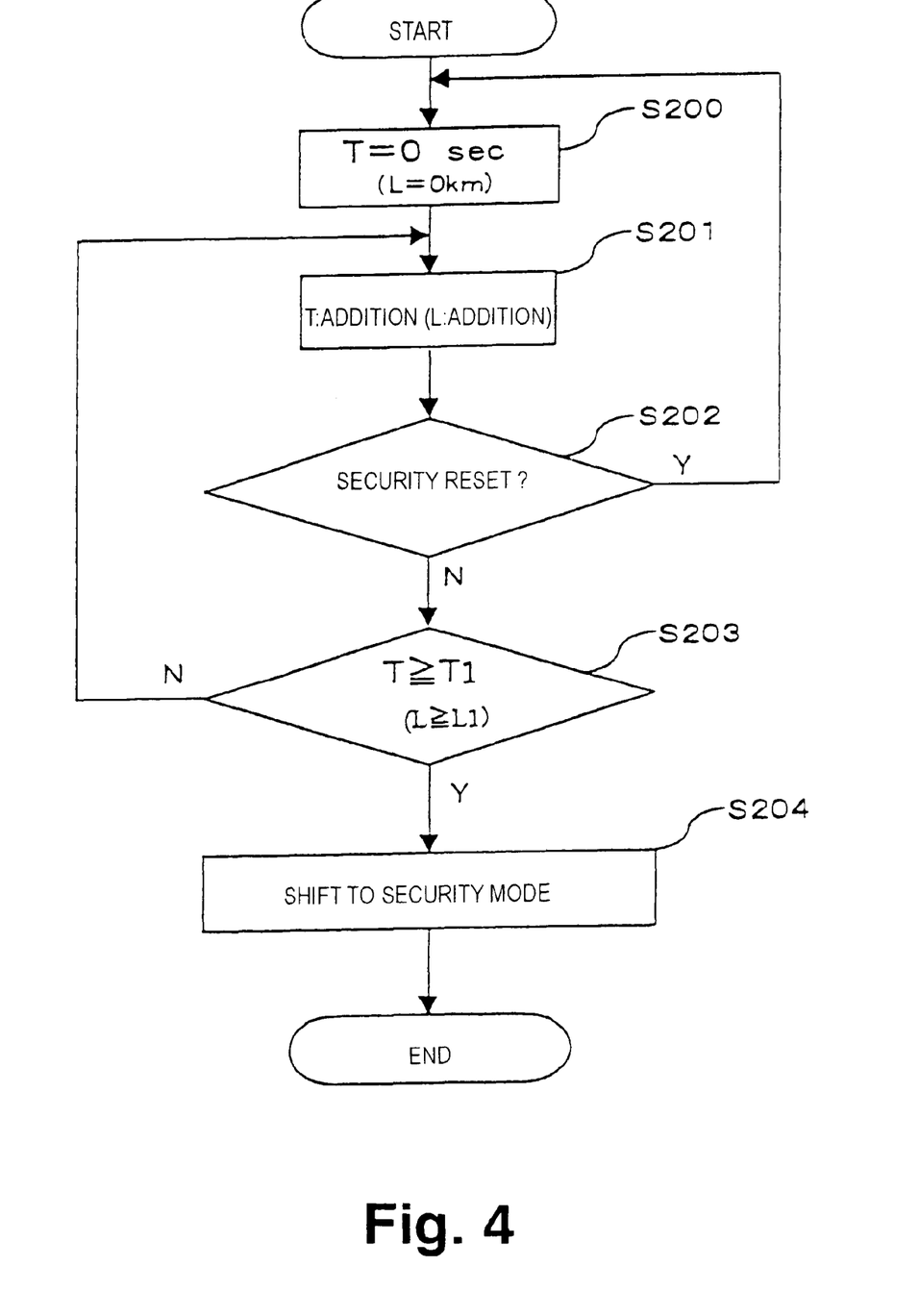
FIG. 4 is a flowchart explaining transition to a security mode of the theft prevention device in the second preferred embodiment of the present invention.

FIG. 4 is a flowchart explaining a procedure to shift to a security mode in a second preferred embodiment. When completion of a reset operation using an authorized user's second portable tool 36 or by an authorized dealer is confirmed, the ECU 14 sets the counter 34 at an initial value (a passed time T=0 for a time measuring counter, a driving distance L=0 for a distance measuring counter) (S200), and then starts addition for the value T or L (S201). During the above operation, the ECU 14 keeps comparing a request code from a first portable tool 16 and a specific code, and, when they coincide with each other, releases a theft prevention function applied by the engine control device 12a, the steering locking device 12b, the door locking device 12c, and so on.

At the same time, the ECU 14 detects whether a security set operation using a second portable tool 36 is applied (S202). In other words, whether or not the ECU 14 receives a counter reset request code from a second portable tool 36 via the receiver 20 is detected. When the ECU 14 receives a counter reset request code coincident with a counter reset code stored in the EEPROM 28, the ECU 14 returns to the process step (S200) to reset the addition value of the counter 34. On the other hand, when a coincident counter reset code is not detected, it is then detected whether or not the addition value T of the counter 34 exceeds a predetermined counter value T1 (e.g., one week) (S203). When it does not yet exceed the counter value T1, or T<T1, the process returns to (S201) to continue addition for value T, and detection of receipt of a security reset code is continued. When the counter value T1 is exceeded, or T≧T1, a security mode is set (S204), while a specific code thus far used as a reference to compare with a request code from the first portable tool 16 is invalidated so that a counter reset code will thereafter be used as a comparison reference in the RAM 24.

With a security mode set, a response code (e.g., a security reset request code) from the second portable tool 36 is compared with a counter reset code read to the RAM 24 so that driving of a vehicle by a third person without the second portable tool 36 is limited. Note that, when T≧T1 is held while the vehicle is running, for security purposes around the vehicle, a security mode is desirably set after confirmation that an engine is stopped or a parking brake is placed in an ON position, similar to embodiment 1.

As described above, in this embodiment, a specific code thus far used to release theft prevention control can be invalidated according to the lapse of a predetermined time or a traveling distance. Therefore, even if a vehicle has been stolen together with a portable tool thus far capable of releasing the theft prevention function, the stolen vehicle will be shifted into a theft prevention condition after the lapse of a predetermined time or the vehicle's running a predetermined distance whereby illegal use of a stolen vehicle can be prevented and subsequent search for the stolen vehicle can be facilitated.

Embodiment 3.

Generally, two or more ignition keys are available to a vehicle in case of losing or damaging one. It is preferable, in view of portability, for a first portable tool 16 to be incorporated into an ignition key. Accordingly, two or more first portable tools 16 may be available. In this case, (when three first portable tools are available in this embodiment,) it is often the case that the user usually uses, for example, a first portable tool 16a, while keeping the other first portable tools 16b, 16c, and so on at home. Should the first portable tools 16b, 16c be stolen, the fact that a tool is stolen may not be known to the user soon enough for him to set a security mode using the second portable tool 18 to prevent vehicle theft in embodiment 1. In view of this, preferably, a control limiting means may be provided to limit control functions of the respective theft prevention devices according to frequency of use of the first portable tool 16.

Figure 5:
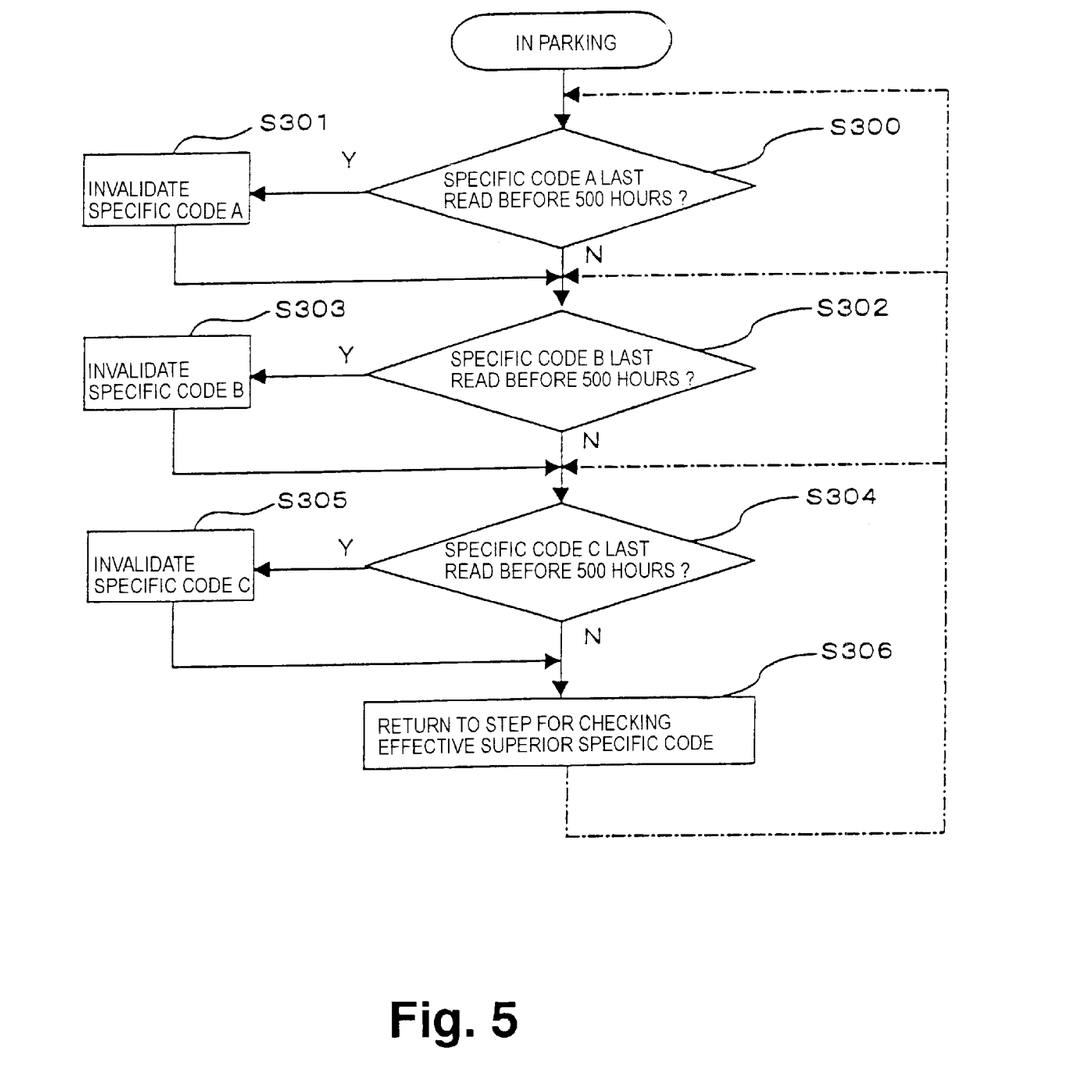
FIG. 5 is a flowchart explaining a procedure for setting a use limit of a first portable tool not in use for a long time in a third preferred embodiment of the present invention.

As shown in the flowchart in FIG. 5, the ECU 14 of FIG. 1 constantly attempts to ascertain the state of use of the first portable tool 16 (first portable tools 16a, 16b, 16c . . . ). Specifically, whether it was before or after a predetermined time (e.g., 500 hours) that a specific code A corresponding to the first portable tool 16a was last read, is detected (S300). When it is before 500 or more hours, the specific code A corresponding to the first portable tool 16a is invalidated to thereby prohibit release of a theft prevention function through comparison with a corresponding specific code (S301). After the specific code A is invalidated or, alternatively, when it is within the last 500 hours that the specific code A was last read, the above checking process is then applied to the first portable tool 16b to see whether it was before or after a predetermined time (e.g., 500 hours) that a specific code B corresponding to the first portable tool 16b was last read (S302). When it is before 500 or more hours, the specific code B corresponding to the first portable tool 16b is also invalidated to thereby prohibit release of a theft prevention function through comparison using a corresponding specific code (S303). A similar process is thereafter applied to the first portable tool 16c to detect frequency of the use of the first portable tool 16c (S304). When the last reading was made before 500 or more hours, a specific code C is invalidated (S305). On the other hand, when it is determined at (S304) that the last reading of a specific code C corresponding to the first portable tool 16c was made within the last 500 hours, the operation process returns to S300, S302, or S304 to carry out a similar check for a remaining effective specific code or codes (provide that specific codes A, B, and C respectively have the top, second, third priorities) to detect frequency of the use of other first portable tools 16 (S306).

With the above check on the frequency of use, a vehicle theft prevention function can be activated even if a first portable tool 16 that has not been used for a long time is stolen, so that security reliability can be improved.

Figure 6:
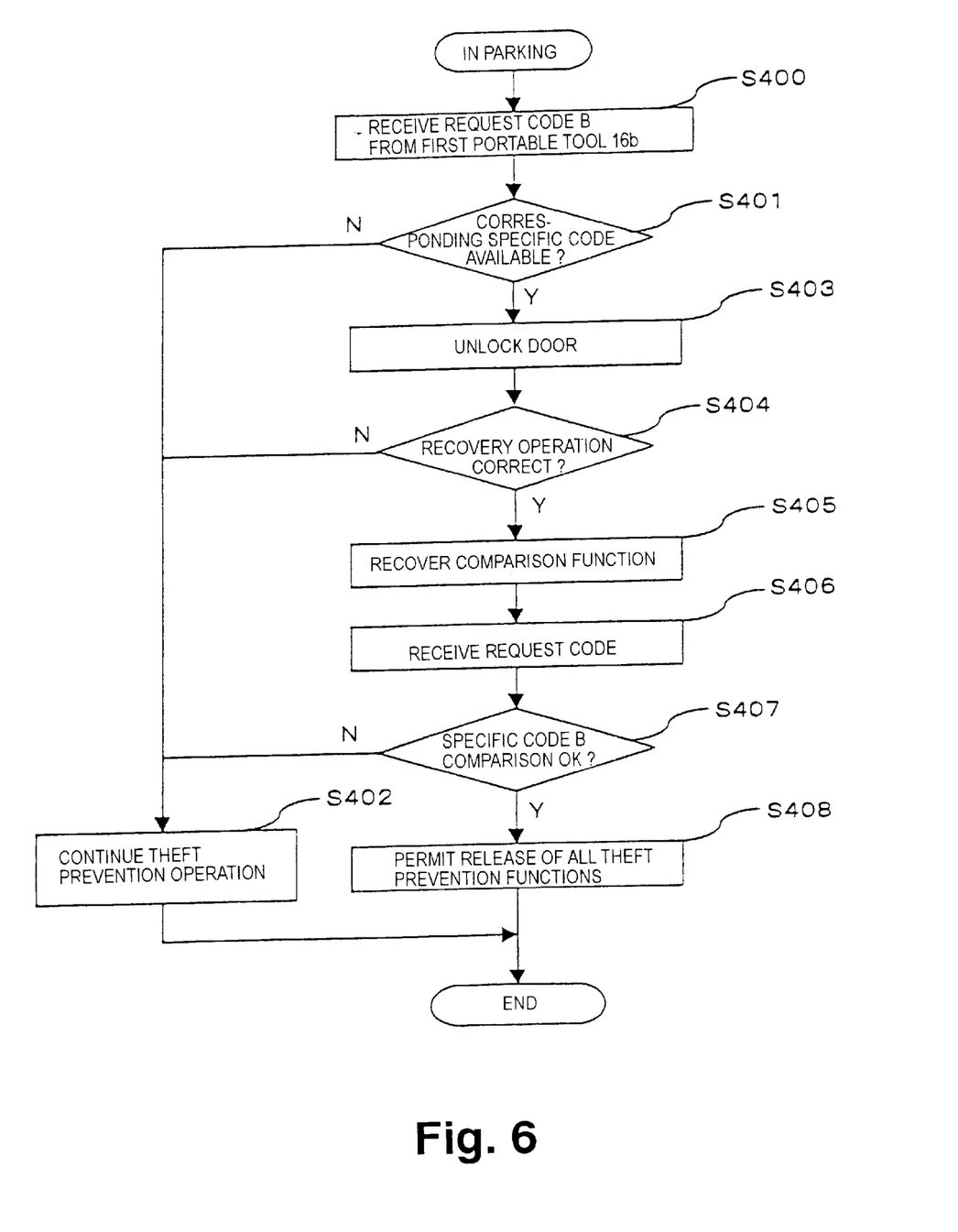
FIG. 6 is a flowchart explaining a procedure for removing the use limit set in the procedure in FIG. 5.

Here, according to the process following the flowchart of FIG. 5, a first portable tool 16 usually used by an authorized user is also subjected to a functional limit after the lapse of 500 hours. These limited functions of such a first portable tool 16 can be recovered by following, for example, a function limit removing procedure, as shown in the flowchart in FIG. 6. Referring to FIG. 6, a procedure to recover a specific code B corresponding to a request code B from the first portable tool 16b, will next be described.

Upon receipt by the ECU 14 in FIG. 1, of a request code B from the first portable tool 16b (S400), the CPU 22 detects whether or not a specific code corresponding to the received request code B is available in the EEPROM 28 (S401). When no such specific code is available, the ECU 14 maintains the theft prevention function by, specifically, continuously limiting the function of the first portable tool 16b (S402). On the other hand, when such a specific code is available, the ECU 14 controls the door locking device 12c to unlock the door (S403) to allow people to get in the vehicle. Subsequently, the ECU 14 detects whether a recovery operation, which should be familiar only to an authorized user, has been duly performed (S404). A recovery operation may be a process applied a predetermined number of times following a predetermined procedure, such as depressing a break pedal five times, pressing a door unlock switch three times, switching on a radio switch four times, switching on a head light eight times, and so on. If the recovery operation is not duly performed, the ECU 14 maintains the theft prevention function (S402) to continuously limit the functions of the first portable tool 16b.

When the recovery operation is duly applied, on the other hand, comparison using a specific code B with respect to the request code B is recovered from a limited state (S405) so that the specific code is thereafter used as a reference to compare with a request code in the RAM 24. Subsequently, a request code being transmitted is received (S206), and subjected to detection as to whether or not it coincides with a specific code B (S407). When they do not coincide, the operation process returns to (S402) to maintain the theft prevention function. When they coincide with each other, on the other hand, the ECU 14 determines that the recovery operation has been performed by an authorized user, and accordingly allows release of all currently applied theft prevention functions (S408).

As described above, by limiting a specific code corresponding to a first portable tool 16 which has not been used for a long time, a theft prevention measure can be applied even if such a first portable tool 16 is stolen together with the vehicle.

Note that, differing from the above examples in which the first portable tool 16 sends a unique request code via radio waves to the vehicle ECU 14, a request code may be read from the shape of a mechanical key inserted into a key cylinder, to be used in comparison with a specific code. A theft prevention device with the latter arrangement can produce identical advantages through application of the above operations using the second portable tools 18, 36. Also note that theft prevention devices other than those described in the above examples, including an engine control device 12a, a steering locking device 12b, and a door locking device 12c, may also be employed.

In the above example, a second portable tool 18, 36, which can send a security request code and/or a counter reset request code, is used instead of a specific code, which is invalidated at a predetermined time. Alternatively, in the case where two or more first portable tools, such as first portable tools 16a, 16b, 16c, are available, and when a specific code A corresponding to the first portable tool 16a is invalidated, the ECU 14 may consider the first portable tool 16b or 16c as a second portable tool, and uses a specific code B or C corresponding thereto as a next specific code for releasing a theft prevention control. This arrangement can also produce identical advantages as that in the above embodiments. In this arrangement, a timer and so on may be additionally provided so as to change an interval between invalidation of a specific code and employment of a substitutional specific code at random.

As described above, according to a vehicle theft prevention device according to the present invention, vehicle control can be prohibited under a predetermined condition despite the use of an authorized portable tool, to thereby block the vehicle from running. As a result, a vehicle theft prevention measure can be easily applied with respect to a third person without the knowledge of the above condition.

INDUSTRIAL APPLICABILITY

As described above, a vehicle theft prevention device according to the present invention is useful to prevent illegal use of a vehicle stolen together with an ignition key and so on, and in is particular suitable for use in preventing vehicle theft and illegal use of a vehicle by a third party without the knowledge of a predetermined condition.

What is claimed is:

1. A vehicle theft prevention device including code obtaining means for obtaining a request code for requesting release of vehicle theft prevention control from a portable tool, memory means for storing a specific code allowing the release, control means for comparing the request code obtained and the specific code so as to release the vehicle theft prevention control when the request code obtained coincides with the specific code and to maintain the vehicle theft prevention control when they do not coincide, the vehicle theft prevention device, comprising:

code changing means for changing specific codes at a predetermined changing time so as to invalidate a currently effective specific code so as to disagree with a request code from the portable tool; and canceling means for canceling invalidation of the specific code, under specific conditions, wherein the canceling means receiving a canceling request code sent from a portable tool other than the portable tool which sends the request code.

2. A vehicle theft prevention device according to claim 1, wherein the memory means has a plurality of predetermined specific codes, and the code changing means sequentially selects the plurality of predetermined specific codes at a predetermined changing time so as to determine a next effective specific code.

3. A vehicle theft prevention device according to claim 1, wherein timing to activate the code changing means is determined based on an accumulated value of a vehicle running distance.

4. A vehicle theft prevention device according to claim 1, wherein timing to activate the code changing means is determined based on an accumulated time after change of the specific codes.

5. A vehicle theft prevention device according to claim 1, wherein timing to activate the code changing means can be changed by a user.

6. A vehicle theft prevention device according to claim 1, wherein the control means compares a corresponding request code with another specific code when specific codes are changed by the code changing means, irrespective of a state of vehicle control, so as to maintain operation thereof.

7. A vehicle theft prevention device according to claim 2, further comprising control limit means for limiting a vehicle theft prevention function allowed based on a specific code having a low frequency of coincidence with a request code obtained, the specific code being among those selected by the code changing means.

8. A vehicle theft preventing device according to claim 1, wherein the canceling means operates when a predetermined condition is met by a predetermined manual canceling operation.

9. A vehicle theft preventing device according to claim 1, wherein the canceling means operates when a canceling request code stored in the memory means is obtained.

10. A vehicle theft preventing device including code obtaining means for obtaining a request code for requesting release of vehicle theft prevention control from a portable tool, memory means for storing a specific code allowing the release, control means for comparing the request code obtained and the specific code so as to release the vehicle theft prevention control when the request code obtained coincides with the specific code and to maintain the vehicle theft prevention control when they do not coincide, the vehicle theft prevention device, comprising:

code changing means for changing specific codes at a predetermined changing time so as to invalidate a currently effective specific code so as to disagree with a request code from the portable tool; and canceling means for canceling invalidation of the specific code, under specific conditions, wherein the specific condition is set by a specific combination of a plurality of manual manipulations of vehicle mounted devices.

11. A vehicle theft preventing device according to claim 10, wherein the plurality of manual manipulations includes at least one of a number of manipulations of one manipulation target, a sequence of manipulations of at least one manipulation target or a combination of a number of manipulations on plural manipulation targets.

12. A vehicle theft preventing device according to claim 10, wherein the canceling request code is not included in the portable tool which sends the request code.

13. A vehicle theft preventing device according to claim 10, wherein the canceling means operates when a canceling request code is sent from another portable tool other than the portable tool which sends the request code and an authorized manual manipulation procedure is performed.

* * * * *